United States Patent [19]

Cinotti

[11] Patent Number: 5,358,092
[45] Date of Patent: Oct. 25, 1994

[54] OVERTURNING DEVICE IN MACHINERY FOR WRAPPING GROUPS OF COMMODITIES

[75] Inventor: Andrea Cinotti, Bologna, Italy

[73] Assignee: Wrapmatic, S.p.A., Bologna, Italy

[21] Appl. No.: 125,339

[22] Filed: Sep. 22, 1993

[30] Foreign Application Priority Data

Sep. 30, 1992 [IT]  Italy .................... BO92 A 000334

[51] Int. Cl.⁵ ............................................ B65G 47/24
[52] U.S. Cl. ............................................ 198/415
[58] Field of Search ............................. 198/411, 415

[56] References Cited

U.S. PATENT DOCUMENTS

| | | | |
|---|---|---|---|
| 3,312,326 | 4/1967 | Huppenthal | 198/415 |
| 3,432,023 | 3/1969 | Lucas | 198/415 X |
| 3,462,001 | 8/1969 | Boyce | 198/415 |
| 4,085,839 | 4/1978 | Crawford | 198/415 X |
| 5,074,400 | 12/1991 | Focke et al. | 198/415 |

FOREIGN PATENT DOCUMENTS 3016940 11/1981 Fed. Rep. of Germany ...... 198/415
1169152 1/1983 Italy .

*Primary Examiner*—James R. Bidwell
*Attorney, Agent, or Firm*—Laff, Whitesel, Conte & Saret, Ltd.

[57] ABSTRACT

Rolls of paper are overturned by a device composed of a first conveyor belt interposed between and occupying the same plane as a feed station and a wrapping station, and running at a velocity comparable to the velocity of the feed station, also a flexibly resilient belt disposed facing the first belt, looped over a pair of wheels of which one is power driven; the resilient belt is positioned with one end adjacent to the feed station, separated from the first belt by a distance equivalent to the diameter of the single roll when disposed with its axis parallel to the first belt, and set in motion at a velocity of which the horizontal component is greater than the velocity of the first belt in such a way that the roll will be taken up, rotated through a right angle and positioned with the axis perpendicular to the first belt.

10 Claims, 3 Drawing Sheets

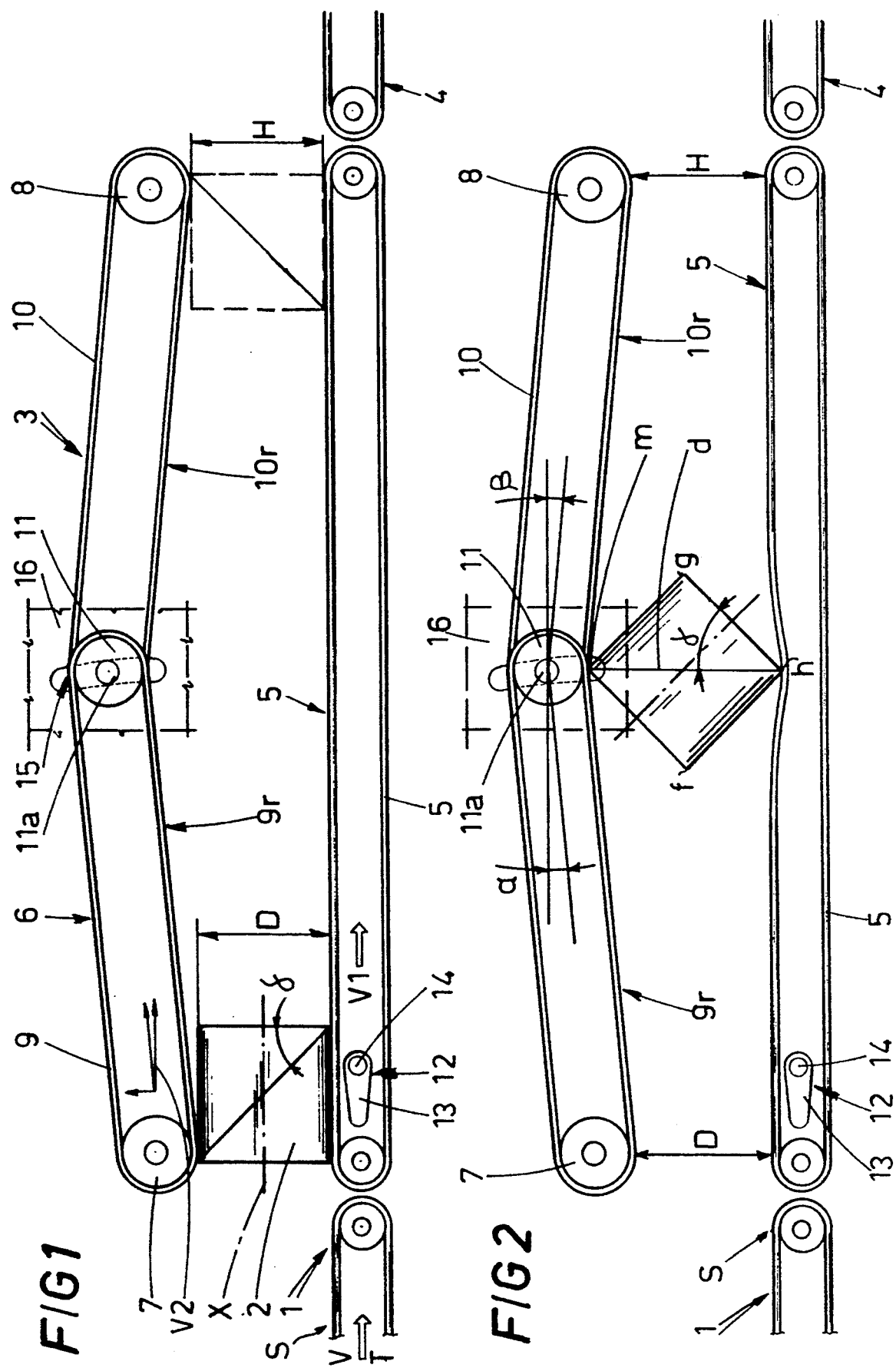

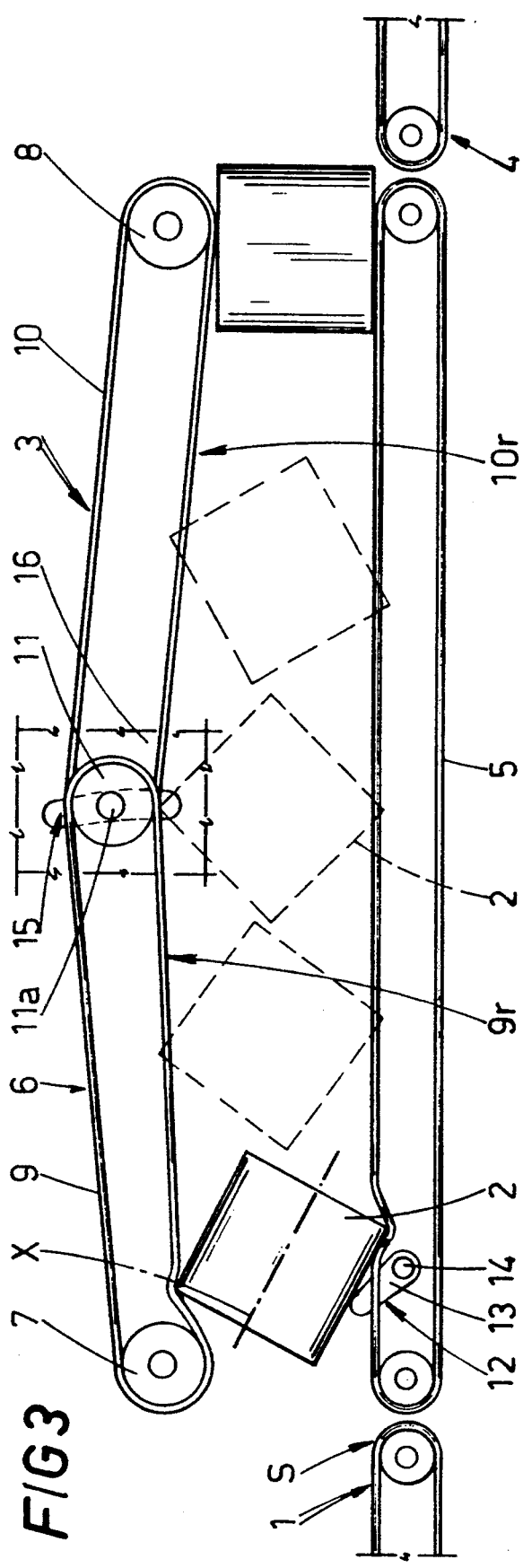
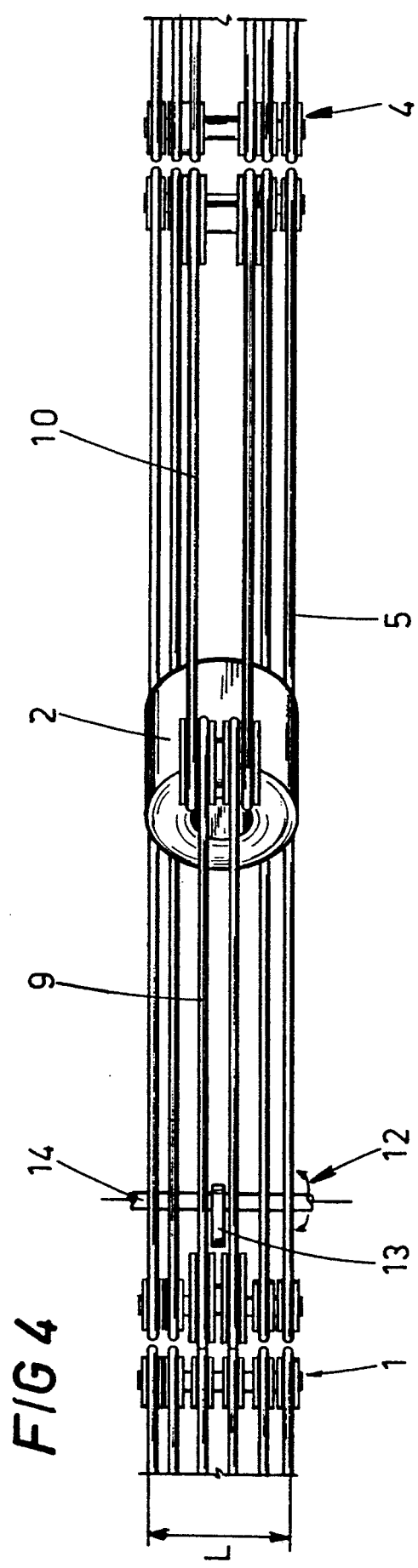

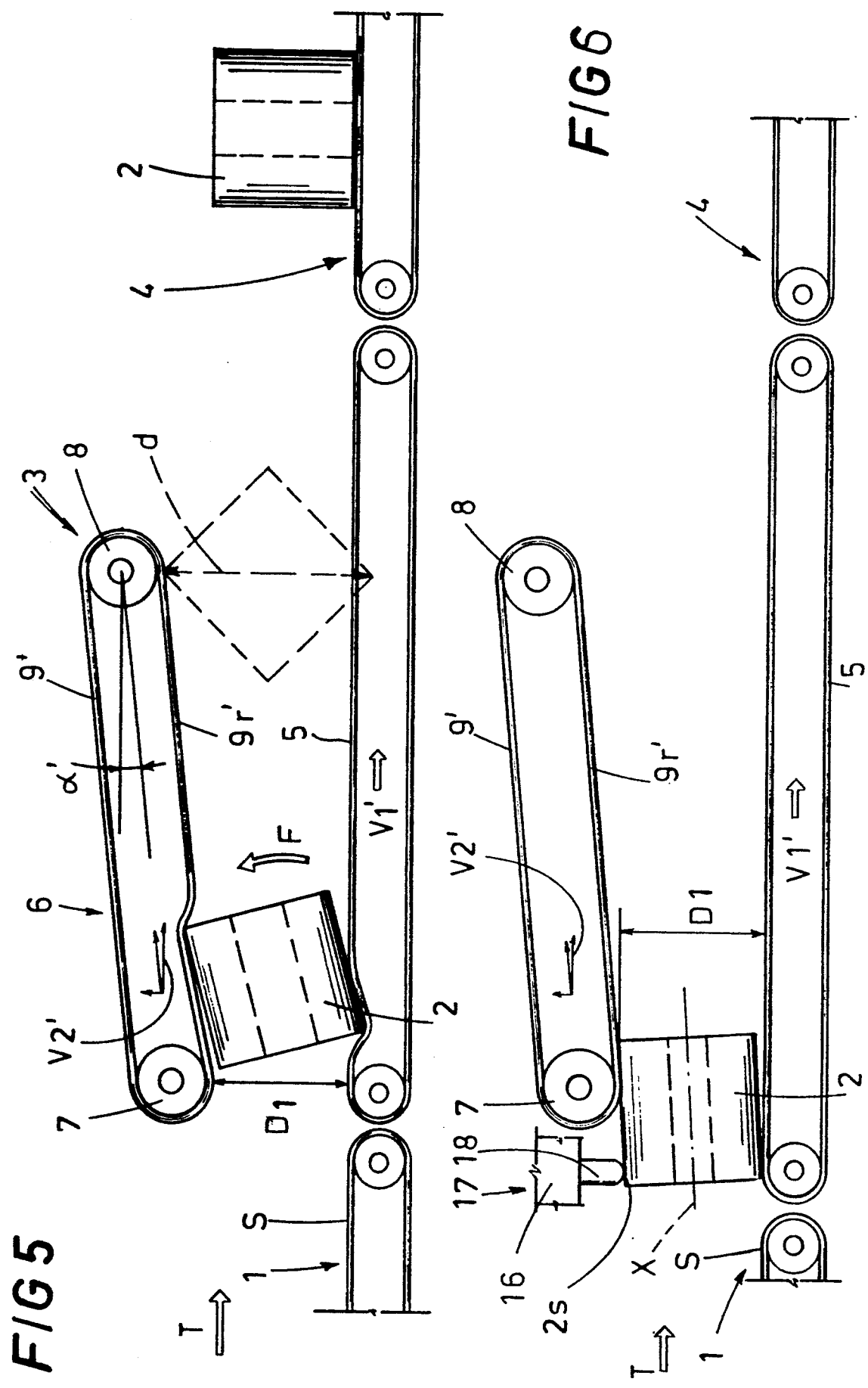

OVERTURNING DEVICE IN MACHINERY FOR WRAPPING GROUPS OF COMMODITIES

BACKGROUND OF THE INVENTION

The present invention relates to an overturning device designed to operate in machines for wrapping groups of essentially soft commodities, typically rolls of kitchen paper, toilet tissue and the like, of which the longitudinal dimension parallel to the wrapping axis remains substantially stable whilst the transverse dimension, disposed perpendicular to and similar in proportion to the longitudinal, is liable to variation when subjected even to a light application of pressure; the single roll of paper is therefore a deformable commodity insofar as it can be compressed in the radial direction, though not in the axial.

Conventionally, commodities of the type in question (rolls of absorbent kitchen paper, toilet tissue) are wrapped by machines, as disclosed in Italian Patent 1 169 152, for example, comprising a feed station through which the commodities are conveyed in single file, advancing horizontally and disposed with the wrapping axis parallel to the conveying surface, and, associated with the feed station, an overturning device by which each emerging commodity is rotated through a right angle to a position in which the wrapping axis is disposed perpendicular to the conveying surface. The repositioned rolls are then arranged in groups to suit the particular packaging format and advanced toward a further station for wrapping, generally in plastic film. The patent overturning device referred to above takes the form (as do similar devices disclosed in U.S. Pat. No. 2,905,341, U.S. Pat. No. 4,564,104 and OS 2 145 599) of a power driven star wheel functioning synchronously with the other stations of the machine, and a guide positioned over one portion of the wheel. The star wheel and guide thus combine to create a channel describing an arc to a circle and extending from the pass line of the feed station to that of the wrapping station.

A solution of this type betrays certain drawbacks, relying as it does on extensive contact with the commodity and essentially mechanical in conception, namely: the overturning movement of the rolls has necessarily to bridge two distinct levels, with the result that the general architecture of the machine itself is rendered cumbersome by reason both of the offset between two operating levels, and of the need for mechanical linkages to connect the drive systems of the machine and the overturning device; what is more, the passage of the rolls through the star wheel is not without risk, especially in view of the change in direction that occurs, somewhat abruptly, on contact with the projections of the wheel. In this latter instance, the fact that the integrity of the product cannot be totally assured also prevents the constructor of the machine from stepping up the rated production tempo.

Accordingly, the object of the present invention is to overcome the drawbacks mentioned above through the provision of an overturning device for wrapping machines such as will be practical in embodiment, and capable of rotating the selected commodities with precision and sensitivity, at high speed, and on a pass line occupying a single plane.

SUMMARY of the INVENTION

The stated object is realized, according to the invention, in an overturning device designed to operate in machines for wrapping multiple packs of commodities, typically rolls of household paper; such a machine comprises a feed station through which the single commodities are conveyed along a horizontal pass line at a predetermined velocity, each with the wrapping axis disposed parallel to the conveying surface, overturning means located at the runout from the feed station, by which each commodity is taken up and repositioned with the wrapping axis perpendicular to the conveying surface, and a station by which the repositioned commodities are grouped and wrapped.

To advantage, the overturning means comprise a first conveyor belt, interposed between the feed station and the wrapping station on substantially the same pass line and set in motion at a linear velocity comparable to that of the feed station, also a moving surface disposed facing the first belt, consisting in a flexible resilient element looped around at least one pair of wheels, one of which is power driven; the resilient element is disposed with one end adjacent to the runout of the feed station and positioned above the first belt at a distance substantially equal to or less than the diameter of the commodity, and set in motion at a linear velocity greater than that of the first belt, measured in a parallel plane, such that the commodity will be taken up and rotated through a right angle into a position with the wrapping axis perpendicular to the conveying surface.

BRIEF DESCRIPTION OF THE DRAWINGS

The invention will now be described in detail, by way of example, with the aid of the accompanying drawings, in which:

FIG. 1 illustrates part of a wrapping machine, seen in side elevation, incorporating the overturning device according to the invention;

FIG. 2 is a side elevation as in FIG. 1, showing an intermediate operating step in the rotation of a commodity;

FIG. 3 is a further side elevation of the device as in FIGS. 1 and 2, illustrating the succession of positions through which the commodity is rotated;

FIG. 4 is a plan view of the device according to the invention;

FIGS. 5 and 6 show two alternative embodiments of the device as in FIGS. 1 to 4, seen in respective side elevations.

DESCRIPTION OF THE PREFERRED EMBODIMENTS

With reference to the drawings, the overturning device according to the invention is designed to operate in machines for wrapping commodities in groups, typically rolls of kitchen paper or toilet tissue; as indicated in FIGS. 1 to 3, such a machine comprises, at least:

a feed station 1, establishing a horizontal pass line along which single commodities 2 advance in a direction denoted T at a predetermined velocity V and in single file, each with its wrapping axis X disposed parallel to the supporting surface S afforded by the feed station 1 (shown schematically as a conveyor belt of conventional embodiment);

overturning means 3 located at one end of the feed station 1, by which the commodities 2 emerging from the station 1 are taken up and repositioned with the wrapping axis X perpendicular to the supporting surface S;

a wrapping station 4 (illustrated indicatively, insofar as the drawings show a conveyor belt along which the commodities would be advanced toward such a station), by which the commodities emerging from the overturning means 3 are ordered into selected multiples and enveloped with plastic film.

More in detail (still observing FIGS. 1 to 3), and in a first embodiment, overturning means 3 comprise a first conveyor belt 5 occupying the same plane as the surface S supporting the commodities 2, and of width L equal at least to the diameter D of the roll (FIG. 4), which is interposed between the feed station 1 and the wrapping station 4 and runs at a velocity V1 comparable, and preferably identical, to the velocity V through the feed station 1.

The overturning means in question further comprise a moving surface disposed facing the first belt 5, consisting in an elastically deformable resilient element 6 looped over a pair of wheels 7 and 8, one of which power driven; the resilient element 6 is positioned with one end of the loop at a distance D above the entry end of the first belt 5 equivalent to the corresponding dimension (diameter) of the commodity 2 when disposed with the wrapping axis X parallel to the supporting surface S, and at a distance H above the exit end equivalent to the corresponding dimension (height) of the commodity 2 when disposed with the same axis X perpendicular to the supporting surface S.

More precisely, and as discernible also in FIG. 4, the resilient element 6 will consist in two pairs of elastic bands 9 and 10 (for practical purposes, round section belts of suitable length, preferably small in diameter and extremely flexible) of which the ends are looped respectively around one of a pair of wheels 7 and 8 coinciding with the wheels at each end of the overturning means 3, and around an intermediate freely revolving third wheel 11, in such a manner as to create a pair of angled active branches 9r and 10r converging substantially toward the middle of the overturning means 3.

Of the two active branches 9r and 10r created in this way, the first is angled at an inclination $\alpha$ of which the high point coincides substantially with a perpendicular position occupied momentarily by the diagonal d of the commodity 2 (see FIG. 2 in particular), and the second at an inclination $\beta$ of which the low point, occurring at the exit end of the overturning means 3, coincides with the axial height H of the commodity 2. Also, the shaft 11a of the third wheel 11 is accommodated internally of a slot 15 afforded by a bearing structure 16 forming part of the machine, in such a way as to allow of correcting or varying the height of the wheel 11 according to the nature and to the corresponding dimension d of the commodity 2; the flexibility of the bands 9 and 10 also contributing to this end. The paired elastic bands 9 and 10 are set in motion at a peripheral velocity of which the value, and in particular the horizontal component V2, will be greater or less than the velocity V1 of the first belt 5 according to the direction (counterclockwise or clockwise) in which the commodity 2 is tilted, when taken up, and rotated so as to position the wrapping axis X perpendicular to the first belt 5 at the end nearer the wrapping station 4.

To advantage, the first belt 5 might be furnished with pushing means 12 at the end nearer to the feed station 1, positioned beneath the active branch of the belt and timed to operate as the commodity 2 is taken up, in such a way as to lift the portion of the commodity destined to enter into contact with the resilient element 6. Such means 12 could be of cam type embodiment, comprising an arm or lever 13 positioned below the level of the active branch of the first belt 5 and keyed to a horizontal shaft 14 rotatable, synchronously with the movement of the commodities 2 through the feed station 1, between an at-rest position (clearly discernible in FIG. 1), disposed parallel with and fully below the level of the active branch of the belt 5, and an operating position (see FIG. 3) rotated upwards at an angle and favoring an initial rotation of the commodity. In a preferred embodiment of the device, the first belt 5 will consist effectively in a plurality of belts arranged in pairs, as illustrated in FIG. 4. In a simplified solution shown in FIG. 5, the bands of the resilient element 6 are two only in number, constituting a single pair denoted 9' and affording just one active branch 9r' that extends from the runout of the feed station 1 toward the central area of the overturning means 3, angled upwardly at an inclination $\alpha'$ of which the high point coincides with the position at which the diagonal dot the commodity 2 reaches the perpendicular.

In this type of arrangement, whereby the commodity is allowed to drop freely into its final position, the resilient element 6, i.e. the single pair of bands 9', can be installed with the end nearer to the feed station 1 distanced from the first belt 5 at a height, denoted D1 in FIG. 5, that is less than the corresponding dimension of the commodity 2 when disposed with its wrapping axis X parallel to the supporting surface S, whilst the velocity of the active branch 9r', or more exactly the horizontal component V2' measured along the direction parallel to the belt 5, is less than the velocity V1' of the belt; thus, the commodity 2 will be taken up and rotated through the right angle in similar fashion, but in the opposite direction (see arrow F, FIG. 5) to that of the first embodiment described. In this solution, with the bands 9' positioned at a height above the belt 5 less than the diametral dimension of the commodity 2, a degree of interference is occasioned, and consequently a measure of restraint sufficient to induce the rotation.

Similarly, in the example of FIG. 6, the lower end of the bands 9' can be positioned at a height D1 equivalent to the corresponding dimension D of the commodity 2, again with the horizontal velocity V2' of the active branch 9r' less than the velocity V1' of the first belt 5; in this instance, the device further comprises interference means 17 installed immediately preceding the lower end of the bands 9' in the feed direction T and positioned at a height above the first belt 5 less than the corresponding dimension D of the advancing commodity 2, in such a manner as to impinge transversely on the topmost rear edge 2s of the advancing commodity 2 and thus initiate the counterclockwise rotation.

More precisely, such interference means 17 consist in a vertical rod 8 associated with the bearing structure 16 and adjustable for position.

An overturning device embodied in accordance with the foregoing description operates in the following manner: the commodities, or rolls 2, advance singly and in succession from the feed station 1 into the overturning means 3 each disposed with the wrapping axis X parallel to the supporting surface S, and are taken up between the first belt 5 and the pairs of bands 9 and 10 (or the single pair of bands 9'). By virtue of their flexible properties, also their angled positions in relation to the surface of the first belt 5 and their higher velocity, the bands 9 and 10 are able to induce a rotational movement of the roll 2 in the clockwise direction, as viewed in the drawings, during which the maximum height will be reached substantially when the roll passes under the third wheel 11 (see FIG. 3, in which the various stages of rotation are illustrated by the figures in phantom line), and in effect when the diagonal d is disposed perpendicular to the conveying surface. Thereafter, the roll 2 is rotated further to the point at which the wrapping axis X and the first belt 5 are disposed mutually perpendicular, i.e. substantially at the runout from the overturning means 3. The roll 2 then advances to the wrapping station 4 to be enveloped as one of a group. In the alternative embodiments of the device with just one pair of bands 9', the roll 2 is rotated positively into the position whereby the diagonal d stands perpendicular to the supporting surface, and then simply allowed to drop to the upright position under its own weight, with the assistance of the thrust transmitted by the bands 9'.

When the peripheral velocity of the first belt 5 is greater than that of the resilient element 6, the steps described above remain essentially the same, but with the difference that the roll 2 rotates in the opposite direction, assisted obviously by the low position of the bands 9' or by the interference means 17, which combine with the first belt 5 to exert added grip.

Defining as $\delta$ the angle compassed by the diagonal d and the side gh of the commodity (see FIG. 2), the respective velocities of the belts and bands of the overturning means are regulated by a law according to which the rotated vertex m of the commodity must describe a movement over the horizontal equivalent to:

$$d.\sin \delta + d.\cos \delta = hm + mf = K$$

The variation in velocity must therefore be:

$$V2 - V1 = K/t$$

Naturally, the commodities 2 might advance in more than one file, or in any event two or more abreast, in which case the device will comprise a plurality of pairs of bands 9 and 10 arranged in parallel, each rotating a respective commodity. It will also be observed that the inclination of the bands 9 and 10 is instrumental in determining the rotation of the commodity 2, given the need to accommodate the variation in height in relation to the angle $\delta$.

The foregoing description implies no limitation; for example, the flexible bands 9 and 10 need not necessarily engage the commodities from above as described and illustrated, but might operate from either side, exploiting the radial deformability of the paper roll.

What is claimed is:

1. An overturning device in machines for wrapping groups of commodities, typically rolls of household paper, comprising:

a feed station through which single commodities advance following a horizontal pass line at a predetermined velocity, each with a wrapping axis disposed parallel to the surface on which it is supported;

a wrapping station by which the commodities are ordered into groups, each with the wrapping axis disposed perpendicular to the supporting surface; overturning means composed of a first conveyor belt occupying substantially the same plane as the supporting surface, interposed between the feed station and the wrapping station and set in motion at a linear velocity comparable to that of the feed station, also a moving surface disposed facing the first belt, consisting in an elastically deformable resilient element looped around at least one pair of wheels, one of which is power driven, wherein the resilient element is disposed with one end adjacent to the runout of the feed station and positioned above the first belt at a distance substantially less than the corresponding dimension of the single commodities when disposed with the wrapping axis parallel to the supporting surface, said moving surface set in motion at a linear velocity of which the component measured in a direction parallel to the first belt is greater than the velocity of the first belt, such that the commodity is taken up and rotated through a right angle into a position with the wrapping axis perpendicular to the first belt, and the end of the resilient element positioned nearer to the feed station is disposed at a height above the first belt substantially equal to the corresponding dimension of the commodity when disposed with the wrapping axis parallel to the supporting surface, further comprising interference means installed immediately preceding the end of the resilient element nearer the feed station, in the conveying direction, at a height less than the corresponding dimension of the commodity, in such a way as to impinge on the topmost rear edge of the commodity and induce its rotation.

2. A device as in claim 1, wherein the interference means consist in a vertical rod associated with a bearing structure of the machine and adjustable for position.

3. An overturning device in machines for wrapping groups of commodities, typically rolls of household paper, comprising:

a feed station through which single commodities advance following a horizontal pass line at a predetermined velocity, each with a wrapping axis disposed parallel to the surface on which it is supported;

a wrapping station by which the commodities are ordered into groups, each with the wrapping axis disposed perpendicular to the supporting surface;

overturning means composed of a first conveyor belt occupying substantially the same plane as the supporting surface, interposed between the feed station and the wrapping station and said first conveyor set in motion at a linear velocity comparable to that of the feed station, also a moving surface disposed facing the first belt, said moving surface consisting in an elastically deformable resilient element looped around at least one pair of wheels, one of which is power driven, wherein the resilient element is disposed with one end adjacent to the runout of the feed station and positioned above the first belt at a distance substantially equal to the corresponding dimension of the single commodities when disposed with the wrapping axis parallel to the supporting surface, said moving surface set in motion at a linear velocity of which the component measured in a direction parallel to the first belt is greater than the velocity of the first belt, such that a commodity is taken up and rotated through a right angle into a position with the wrapping axis perpendicular to the first belt, and said overturning means comprising a resilient element that consists in a single pair of elastic bands looped around and tensioned between a pair of wheels of which one is located at the end of the overturning means nearer to the runout of the feed station and the other substantially in a central position along the length of the overturning means, in such a way as to afford one active branch angled at an inclination of which the high point occurs at an intermediate location along the overturning means and coincides substantially with a position in which the diagonal of the commodity is disposed perpendicular to the supporting surface.

4. An overturning device in machines for wrapping groups of commodities, typically rolls of household paper, comprising:

a feed station through which single commodities advance following a horizontal pass line at a predetermined velocity, each with a wrapping axis disposed parallel to the surface on which it is supported;

a wrapping station by which the commodities are ordered into groups, each with the wrapping axis disposed perpendicular to the supporting surface; overturning means composed of a first conveyor belt occupying substantially the same plane as the supporting surface, interposed between the feed station and the wrapping station and set in motion at a linear velocity comparable to that of the feed station, also a moving surface disposed facing the first belt, consisting in an elastically deformable resilient element looped around at least one pair of wheels, one of which is power driven, wherein the resilient element is disposed with one end adjacent to the runout of the feed station and positioned above the first belt at a distance substantially less than the corresponding dimension of the single commodities when disposed with the wrapping axis parallel to the supporting surface, said moving surface set in motion at a linear velocity of which the component measured in a direction parallel to the first belt is greater than the velocity of the first belt, such that the commodity is taken up and rotated through a right angle into a position with the wrapping axis perpendicular to the first belt, and said overturning means comprising a resilient element that consists in a single pair of elastic bands looped around and tensioned between a pair of wheels of which one is located at the end of the overturning means nearer to the runout of the feed station and the other substantially in a central position along the length of the overturning means, in such a way as to afford one active branch angled at an inclination of which the high point occurs at an intermediate location along the overturning means and coincides substantially with a position in which the diagonal of the commodity is disposed perpendicular to the supporting surface.

5. An overturning device in machines for wrapping groups of commodities, typically rolls of household paper, comprising:

a feed station through which single commodities advance following a horizontal pass line at a predetermined velocity, each with a wrapping axis disposed parallel to the surface on which it is supported;

a wrapping station by which the commodities are ordered into the wrapping axis disposed perpendicular to the supporting surface;

overturning means composed of a first conveyor belt occupying substantially the same plane as the supporting surface, interposed between the feed station wrapping station and said first conveyor set in motion at a linear velocity comparable to that of the feed station, also a moving surface disposed facing the first belt, said moving surface consisting in an elastically deformable resilient element loped around at least one pair of wheels, one of which is power driven, wherein the resilient element is disposed with one end adjacent to the runout of the feed station and positioned above the first belt at a distance substantially equal to the corresponding dimension of the single commodities when disposed with the wrapping axis parallel to the supporting surface, said moving surface set in motion at a linear velocity of which the component measured in a direction parallel to the first belt is greater than the velocity of the first belt, such that a commodity is taken up and rotated through a right angle into a position with the wrapping axis perpendicular to the first belt, and said overturning means comprising a resilient element that consists in a double pair of elastic bands, each looped over and tensioned between a pair of wheels of which one is located at one end of the overturning means and the other is freely rotatable and occupies a substantially central position along the overturning means, in such a way as to afford two angled active branches converging substantially toward the center of the overturning means: a first presenting an inclination of which the high point coincides substantially with a position in which the diagonal of the rotated commodity is disposed perpendicular to the first belt, and a second presenting an inclination of which the low point coincides with the end of the overturning means nearer to the wrapping station, and at least with the wrapping axis of the commodity when disposed perpendicularly to the first belt.

6. A device as in claim 5, wherein the wheel occupying a substantially central position on the overturning means is mounted to a shaft accommodated in a slot afforded by a bearing structure forming part of the machine, in such a way as to allow of correcting or varying the height of the wheel according to the nature and the dimensions of the commodity.

7. An overturning device in machines for wrapping groups of commodities, typically rolls of household paper, comprising:

a feed station through which single commodities advance following horizontal pass line at a predetermined velocity, each with a wrapping axis disposed parallel to the surface on which it is supported;

a wrapping station by which the commodities are ordered into groups, each with the wrapping axis disposed perpendicular to the supporting surface; overturning means composed of a first conveyor belt occupying substantially the same plane as the supporting surface, interposed between the feed station and the wrapping station and set in motion at a linear velocity comparable to that of the feed station, also a moving surface disposed facing the first belt, consisting in an elastically deformable resilient element looped around at least one pair of wheels, one of which power driven, wherein the resilient element is disposed with one end adjacent to the runout of the feed station and positioned above the first belt at a distance substantially less than the corresponding dimension of the single commodities when disposed with the wrapping axis parallel to the supporting surface, said moving surface set in motion at a linear velocity of which the component measured in a direction parallel to the first belt is greater than the velocity of the first belt, such that the commodity is taken up and rotated through a right angle into a position with the wrapping axis perpendicular to the first belt, and said overturning means comprising a resilient element that consists in a double pair of elastic bands, each looped over and tensioned between a pair of wheels of which one is located at one end of the overturning means and the other is freely rotatable and occupies a substantially central position along the overturning means, in such a way as to afford two angled active branches converging substantially toward the center of the overturning means: a first presenting an inclination of which the high point coincides substantially with a position in which the diagonal of the rotated commodity is disposed perpendicular to the first belt, and a second presenting an inclination of which the low point coincides with the end of the overturning means nearer to the wrapping station, and at least with the wrapping axis of the commodity when disposed perpendicularly to the first belt.

8. A device as in claim 7, wherein the wheel occupying a substantially central position on the overturning means is mounted to a shaft accommodated in a slot afforded by a bearing structure forming part of the machine, in such a way as to allow of correcting or varying the height of the wheel according to the nature and the dimensions of the commodity.

9. An overturning device in machines for wrapping groups of commodities, typically rolls of household paper, comprising:

a feed station through which single commodities advance following a horizontal pass line at a predetermined velocity, each with a wrapping axis disposed parallel to the surface on which it is supported;

a wrapping station by which the commodities are ordered into groups, each with the wrapping axis disposed perpendicular to the supporting surface;

overturning means composed of a first conveyor belt occupying substantially the same plane as the supporting surface, interposed between the feed station and the wrapping station and said first conveyor set in motion at a linear velocity comparable to that of the feed station, also a moving surface disposed facing the first belt, said moving surface consisting in an elastically deformable resilient element looped around at least one pair of wheels, one of which is power driven, wherein the resilient element is disposed with one end adjacent to the runout of the feed station and positioned above the first belt at a distance substantially equal to the corresponding dimension of the single commodities when disposed with the wrapping axis parallel to the supporting surface, said moving surface set in motion at a linear velocity of which the component measured in a direction parallel to the first belt is greater than the velocity of the first belt, such that a commodity is taken up and rotated through a right angle into a position with the wrapping axis perpendicular to the first belt, and pushing means located at the end of the overturning means nearer to the feed station, positioned beneath the active branch of the first belt and made to operate synchronously with the belt as the commodity is taken up, in such a way as to lift the portion of the commodity destined to enter into contact with the resilient element.

10. A device as in claim 9, wherein the first belt is of split embodiment, affording a longitudinal gap, and pushing means consist in a lever positioned below the level of the active branch of the belt, keyed to a horizontal shaft rotatable synchronously with the emergence of a commodity from the feed station in such a way as to occasion the movement of the lever between an at-rest position, disposed substantially parallel with the active branch of the belt, and an operating position rotated upward and beyond the active branch of the belt, passing through the longitudinal gap.

* * * * *